United States Patent [19]

Jawdoszyn

[11] Patent Number: 4,984,481
[45] Date of Patent: Jan. 15, 1991

[54] AUTOMOTIVE ANTI-THEFT STEERING LOCK

[75] Inventor: Claude Jawdoszyn, Sannois, France

[73] Assignee: Neiman, Courbevoie, France

[21] Appl. No.: 286,791

[22] Filed: Dec. 20, 1988

[30] Foreign Application Priority Data

Dec. 21, 1987 [FR] France ............................ 87 17808

[51] Int. Cl.$^5$ ......................... G05G 1/00; G05G 5/06
[52] U.S. Cl. .................................. 74/577 S; 74/527; 74/492; 70/252
[58] Field of Search ............... 74/552, 527, 526, 492, 74/495, 497, 577 R, 577 S, 529; 70/252, 209; 180/287

[56] References Cited

U.S. PATENT DOCUMENTS

| | | | |
|---|---|---|---|
| 1,270,007 | 6/1918 | Cloyed | 74/577 S |
| 1,442,003 | 1/1923 | Rohrer | 74/577 S |
| 1,516,681 | 11/1924 | Palmer | 74/577 S X |
| 1,767,593 | 6/1930 | Laabs | 74/577 S |
| 1,868,558 | 7/1932 | Anderson | 74/577 S |
| 4,267,748 | 5/1981 | Grunewald et al. | 74/529 |
| 4,658,610 | 4/1987 | Weber | 70/252 |
| 4,881,389 | 11/1989 | Alfon et al. | 70/209 |

FOREIGN PATENT DOCUMENTS

| | | | |
|---|---|---|---|
| 2632908 | 12/1980 | Fed. Rep. of Germany | 70/252 |
| 681042 | 8/1929 | France | 74/577 S |
| 0090127 | 7/1981 | Japan | 74/577 S |
| WO83/03580 | 10/1983 | World Int. Prop. O. | 70/252 |

Primary Examiner—Vinh T. Luong
Attorney, Agent, or Firm—Wenderoth, Lind & Ponack

[57] ABSTRACT

An anti-theft steering lock includes a locking sleeve fixed to a steering shaft and having substantially radial teeth. Pivoted levers each having a pointed tip are freely pivoted on axes extending parallel to the steering shaft and fixed to a fixed support in which cradle portions are formed. The levers are nested in these cradle portions. Second ends of the levers, opposed to the pointed tip ends, cooperate with a window formed in a control bracket which has a narrow zone and a wide zone. The angular spacing between the pointed tips of the levers is slightly smaller than the angular spacing (a) between two successive teeth of the locking sleeve, or a whole number multiple of this angular spacing.

2 Claims, 1 Drawing Sheet

AUTOMOTIVE ANTI-THEFT STEERING LOCK

BACKGROUND OF INVENTION

1. Field of the Invention

This invention relates to an anti-theft steering lock having two pivoting levers, for automotive vehicles.

2. Description of the Prior Art

For locking the steering shaft of a vehicle in any rotational position, it has already been proposed to use two independent levers cooperating with grooves formed in a member which is fixed to the steering shaft. For example, Patent No. 2632908 of the Federal Republic of Germany teaches a steering shaft which is provided with a dished sleeve having through openings in its skirt portion; locking is obtained by means of two levers or latches comprising levers pivoted about axes which are orthogonal to the shaft. This known type of anti-theft lock necessitates the provision of protection to prevent access to the dished sleeve, while it also has the disadvantage of being very bulky. In addition, in the event of any attempt to force the lock, the levers are subjected to bending, and the resulting forces are transmitted to the mechanism of the anti-theft steering lock.

In Patent No. 3414277 of the Federal Republic of Germany which corresponds to U.S. Pat. No. 4,658,610, it has also been proposed to use two independent levers, arranged for movement in a straight line and cooperating with a toothed crown which is fixed to the steering shaft, with at least one of the levers being arranged so as always to fall between two of the teeth of the crown. If such a steering lock is to be able to be less bulky than the other known anti-theft steering lock mentioned above, it nevertheless still has the disadvantage that the forces applied to the levers are transmitted to the lock mechanism. Besides this, its construction is complicated and difficult.

SUMMARY OF THE INVENTION

Accordingly, the present invention seeks to provide an anti-theft steering lock of the two lever type, which is of extremely simple and economical construction, which is of reduced bulk, and in which the forces resulting from any attempt to rotate the steering shaft forcibly are not transmitted to the mechanism of the steering lock, but are entirely absorbed by the levers themselves and by their support means.

With these objects in mind, the anti-theft steering lock according to the invention is characterised by a sleeve fixed to a steering shaft, substantially radial teeth provided on the sleeve, two locking levers each having a pointed tip, a fixed latch support having cradle portions formed therein, means freely pivoting each locking lever in a respective one of the cradle portions whereby to bear against the latter, each pivot means defining a pivot axis parallel to the steering shaft and fixed to the latch support, and a control bracket having a window comprising a narrow zone and a wide zone. The arrangement is such that second end portions of the locking levers, at ends thereof opposite from the pointed tips, cooperate with the window so as to be urged towards each other when in the narrow zone of the window, and so that in the wide zone thereof the second ends are no longer in contact with the bracket. The angular spacing between the pointed tips of the locking levers is slightly smaller than the angular spacing between two successive teeth of the locking sleeve or a whole number multiple thereof.

Preferably, a spring is disposed between the second ends of the locking levers so as to bias the second ends away from each other.

The invention will be better understood from the following description, which is made with reference to the annexed drawings.

DESCRIPTION OF A PREFERRED EMBODIMENT

Figure 1:
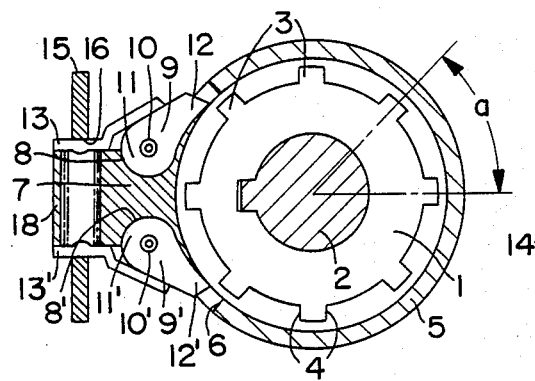
FIG. 1 is a diagrammatic plan view, in partial cross-section substantially along line 1—1 in FIG. 2 showing an anti-theft steering lock according to one embodiment of the invention, shown in the unlocked position.

In the example now to be described, a locking sleeve 1 is keyed on to a steering shaft 2. The sleeve 1 has, spaced at regular intervals around its circumference, teeth 3 with substantially radial flanks 4. The angle subtended between two successive teeth 3 is the angle a. The assembly is surrounded by a steering tube or column 5 which has a lateral slot or window 6.

A fixed member 7 comprising a latch carrier is disposed in facing relationship with the window 6, and has two laterally facing openings defining cradle portions 8 and 8', which are opposed to each other and which face outwardly from the carrier 7. Two locking levers 9 and 9' are freely pivoted on axes 10, and 10' respectively, that comprise pins fixed to the latch carrier 7 and extend parallel to the steering shaft 2. The levers 9 and 9' each include a portion 11, 11' respectively, which is of circular cross-section corresponding to that of the cradle portions 8, 8', respectively, in which the portions 11 and 11' are located. The end of each of the levers 9, 9' adjacent to the steering column 5 is located within the window 6 and terminates in a pointed tip portion, 12, 12', respectively. The angular spacing between the tips 12 and 12' is slightly smaller than twice the angle a.

The locking levers 9 and 9' have end portion 13, 13' respectively, at the ends opposite from the tips 12 and 12'. The end portions 13, 13' are located in a window 14 formed in a control bracket 15, which is movable, in a direction parallel to the axis of the steering shaft 2, under the control of a locking and unlocking mechanism (not shown). This may be a key operated mechanism, an electric motor, or any other suitable device. The window 14 in the bracket 15 includes a narrow portion 16 and a wide portion 17, arranged in longitudinal relationship to each other with respect to the direction in which the bracket 15 can move. A helical compression spring 18 is interposed between the end portions 13 and 13' of the levers 9 and 9', respectively, so as to tend to urge these ends away from each other.

Figure 2:
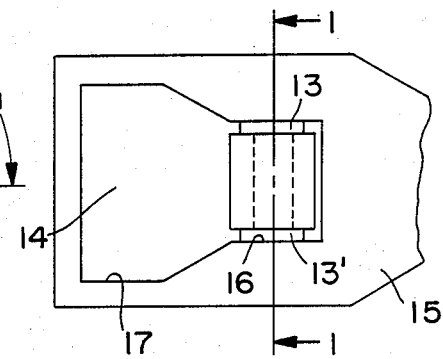
FIG. 2 is a side elevation of a portion of the steering lock of FIG. 1, as viewed from the left thereof, in an unlocked position.
Figure 3:
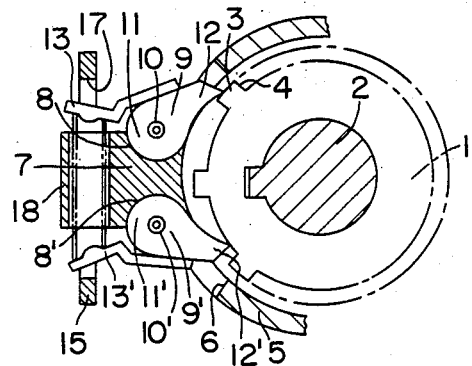
FIG. 3 is a view similar to FIG. 1 and substantially along line 3—3 in FIG. 4, but showing a pre-locking position.
Figure 4:
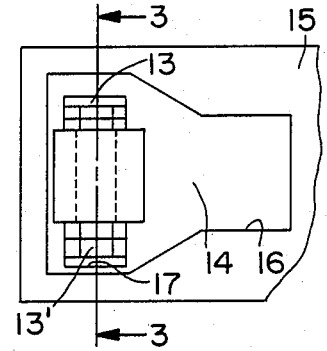
FIG. 4 is a view similar to FIG. 2, and shows the same position as is seen in FIG. 3.
Figure 5:
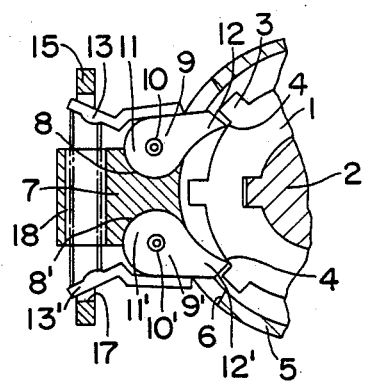
FIG. 5 is a view similar to FIGS. 1 and 3, and along a section line similar to that of FIG. 3 and showing a locking position.

The bracket 15 is arranged to occupy, selectively, an unlocking position (FIGS. 1 and 2) and a locking position (FIGS. 3 to 5). In the unlocking position, the end portions 13 and 13' of the locking levers are in the narrow portion 16 of the window 14 and are thus urged towards each other, in a positive manner, against the action of the spring 18. The tips 12, 12' of the levers 9 and 9' are retracted so as to be clear of the teeth 3 of the locking sleeve 1. The steering shaft 2 is thus free.

In the locking position of the bracket 15, the end portions 13 and 13' of the levers 9, 9' are in the wide portion 17 of the window 14, so that they are urged apart by the spring 18. The tips 12 and 12' of the locking levers extend through the window 6 of the steering column 5 and are in contact with the locking sleeve 1. The arrangement is such that the end portions 13 and 13' are, in this position, no longer in contact with the bracket 15.

By coming into contact with the sleeve 1, at least one of the tips 12, 12' becomes lodged between two successive teeth 3 of the locking sleeve 1.

Three situations may now arise. If the tip 12' falls between two teeth 3 and the other tip 12 falls on one tooth 3, the "pre-locking" position shown in FIG. 3 is obtained. Rotation of the steering shaft through a very small angle in a clockwise direction (considered with reference to the drawing) brings the locking levers 9 and 9' into the positive locking position seen in FIG. 5, which will be explained below and which constitutes the second of the above-mentioned situations.

Rotation of the steering shaft through a small angle in the counter clockwise direction from the FIG. 3 position brings the levers 9 and 9' into an intermediate position, in which each of the tips 12 and 12' then lies between two teeth 3, the tips being separated from each other by two successive teeth. This intermediate position, which is not shown in the drawings, is the third situation, which happens to be statistically the most probable. If the steering shaft 2 is rotated from this intermediate position in either direction, one of the tips 12, 12' is raised by a tooth 3 against the action of the spring 18, and, after rotation through an angle smaller than a, the assembly then assumes the locking position seen in FIG. 5.

In this position, in which locking is always achieved by the assembly after the steering shaft 2 has rotated through an angle less than a, each of the locking lever tips 12, 12' lies in the region of the root of a tooth 3. Any attempt at forcible rotation of the steering shaft 2 causes whichever of the tips 12, 12' is the leading one in the direction of rotation to become wedged against the root of the adjacent tooth 3. The resulting force on the locking lever 9 or 9' concerned is transmitted by the rounded portion 11 or 11' to the cradle portion 8 or 8'. This force is thus transmitted entirely to the latch carrier 7, which will accordingly be constructed with sufficient strength to withstand this force. No force is transmitted to the bracket 15 which is fixed to the control mechanism.

In the example described, the angular spacing between the tips 12 and 12' is slightly smaller than twice the angle a. It may however be slightly smaller than a, or slightly smaller than any whole number multiple of a greater than 2. The maximum angle through which the steering shaft can be turned before reaching the positive locking position can thus be varied at will. The theoretical minimum angle is however limited by the thickness of the levers 9 and 9', which should be smaller than the spacing between two successive teeth 3.

What is claimed is:

1. A two lever anti-theft steering lock for an automotive vehicle having a steering shaft, said lock comprising:

a sleeve to be fixed to the steering shaft, substantially radial teeth being provided on said sleeve, two locking levers each having a pointed tip, a fixed latch support having cradle portions formed therein, means freely pivoting each said locking lever in a respective one of said cradle portions whereby to bear against the latter, each said pivot means defining a pivot axis parallel to the steering shaft and fixed to said latch support, a control bracket having a window comprising a narrow zone and a wide zone, second end portions of said locking levers, at ends thereof opposite from said pointed tips, cooperating with said window so as to be urged towards each other when in said narrow zone of said window by contact with edges of said bracket defining said narrow zone, and so that in said wide zone thereof said second ends are no longer in contact with said bracket, and the angular spacing between said pointed tips of said locking levers being slightly smaller than the angular spacing between two successive said teeth of said locking sleeve or a whole number multiple thereof.

2. An anti-theft steering lock according to claim 1, further comprising a spring disposed between said second ends of said locking levers so as to bias said second ends away from each other.

* * * * *